United States Patent [19]
Kruest

[11] Patent Number: 5,963,144
[45] Date of Patent: Oct. 5, 1999

[54] CLOAKING CIRCUIT FOR USE IN A RADIOFREQUENCY IDENTIFICATION AND METHOD OF CLOAKING RFID TAGS TO INCREASE INTERROGATION RELIABILITY

[75] Inventor: James R. Kruest, Escondido, Calif.

[73] Assignee: Single Chip Systems Corp., San Diego, Calif.

[21] Appl. No.: 08/865,799

[22] Filed: May 30, 1997

[51] Int. Cl.$^6$ .................................................. H04Q 1/00
[52] U.S. Cl. ................................. 340/825.54; 340/572.7
[58] Field of Search ............................. 340/825.54, 572, 340/573, 572.7; 343/701, 895; 455/83; 342/42

[56] References Cited

U.S. PATENT DOCUMENTS

| | | | |
|---|---|---|---|
| 3,694,754 | 9/1972 | Baltzer | 343/701 |
| 4,414,690 | 11/1983 | Norboldt | 343/701 |
| 5,074,947 | 12/1991 | Estes et al. | |
| 5,196,371 | 3/1993 | Kulesza et al. | |
| 5,237,130 | 8/1993 | Kulesza et al. | |
| 5,418,358 | 5/1995 | Bruhnke | 340/825.54 |
| 5,471,196 | 11/1995 | Pilsted | 340/572 |
| 5,611,140 | 3/1997 | Kulesza et al. | |
| 5,701,121 | 12/1997 | Murdoch | 340/825.54 |
| 5,701,595 | 12/1997 | Green | 455/83 |

*Primary Examiner*—Brian Zimmerman
*Attorney, Agent, or Firm*—Daniel L. Dawes

[57] ABSTRACT

The antenna of an RFID tag or label is disconnected from the balance of the RFID chip by means of a series switch activated in response to a logic command, CLOAK, generated by the RFID chip. Activation of the switch disconnects the antenna of the RFID tag for the remainder of the RFID chip and effects a high impedance resistance across the antenna terminals. An RC circuit is charged by activation of the CLOAK signal and thereafter discharges during a predetermined RC time period as determined by a high impedance series antifuse leakage transistor. The antenna is thus disconnected for a time sufficient to allow the remaining RFID tags in an RF interrogation field to be identified. Meanwhile, during the disconnection of the antenna from the RFID chip and its loading causes its effective absorption and scattering aperture to be reduced near zero so as to electromagnetically remove the RFID tag from the zone of interrogation during the predetermined time period. Hence, the interrogated tag remains disconnected and noninterferring with the RF field used to interrogate the remaining tags.

18 Claims, 2 Drawing Sheets

CLOAKING CIRCUIT FOR USE IN A RADIOFREQUENCY IDENTIFICATION AND METHOD OF CLOAKING RFID TAGS TO INCREASE INTERROGATION RELIABILITY

BACKGROUND OF THE INVENTION

1. Field of the Invention

The invention relates to radio frequency identification tags or labels and in particular to a cloaking circuit used to assist in the read operations of RFID transponders.

2. Description of the Prior Art

Marsh et al, "Electronic Identification System," U.S. Pat. No. 5,537,105 (1987) describes an identification system utilizing an interrogator and plurality of transponder tags or labels. The system utilizes an interrogator/reader 2 for identifying one or more transponders 4 within a monitored space as diagrammatically depicted in Marsh's FIG. 1. The interrogator transmits a radio frequency signal, which when received by the transponder, is utilized by the transponder to provide DC power to the transponder. Both the interrogator and transponder utilize coded transmissions. The transponders transmit a reply after a random delay time period allowing the multiple transponders within the same field of view of the interrogator to be individually read due to the reduced chance of collision between respective transponder output signals.

To further improve the readings of the multiple transponders that are simultaneously interrogated, each transponder unit turns itself off after the reader has successfully identified the transponder. The shut down circuit is indicated by a momentary cessation of the interrogation signal. A transponder transmission is disabled by means of flip-flop 38 disposed between code generator 36 and modulator 40. The flip-flop is switched to disable the modulator input responsive to logic circuit 42. Logic circuit 42 monitors the presence of the interrogation signal from the transponder receiving antenna 30. The transponders are subsequently reset by removal of the interrogation signal for predetermined time.

Tervoert et al, "Electromagnetic Identification System for Identifying a Plurality of Coded Responders Simultaneously Present in an Interrogation Field," U.S. Pat. No. 5,124,699 (1992) describes a system which, like the Marsh system, utilizes a plurality of RF field power transponder 40 responding to an interrogation signal after a random delay with an encoded transmission. Upon successful identification of the transponder, the transponder switches to a passive mode and remains in such mode until reset by removal of the interrogation signals or a change in its frequency.

Pilested, "Security System for Survailing the Passage of Commodities Through Defined Zones," U.S. Pat. No. 5,471,196 (1995) shows in FIG. 4 a transponder including a transmitter 5 and receiver 4 which are coupled to an antenna 7. Antenna 7 is tuned by capacitor 1 through a switch 3. Switch 3, receiver 4 and transmitter 5 are controlled by logic circuit 6. Subsequent to the transmission period, T1, switch 3 is opened detuning antenna 7 and preventing transmission through antenna 7 until the next transmit time period. During time period T2 that switch 3 is open, the security system is able to receive reply signals from other transponders.

Jeuch et al, "Automatic Identification System for Objects or Persons by Remote Interrogation," U.S. Pat. No. 5,528,221 (1996) describes a system of RF field power tags which are interrogated by a coded transmission. The tags respond and upon successful receipt of the tag's response, the tag inhibits itself utilizing one of flip-flops 26 as shown in FIG. 3 to temporarily inhibit further operation.

Evereft et al, "Identification System and Method With Passive Tag," U.S. Pat. No. 5,492,468 (1996) describes a system having a portable tag 14 which includes a voltage doubler 42 for providing a DC voltage to a storage capacitor 44. When the voltage across capacitor 44 exceeds 5 volts, a power-up circuit 48 closes switch 50 to provide power to remaining tag circuits 38. This in turn causes capacitor 44 to be discharged. Capacitor 44 has sufficient charge on it to insure that the tag can completely transmit its coded information. As capacitor 44 recharges, switch 50 is maintained open by a time-out circuit, which limits how often the tag can provide a transmission, thereby enabling the identification system to receive signals from other tags.

Cato et al., "Time Division Multiplexed Batch Mode Item Identification System," U.S. Pat. No. 5,539,394 (1996) describes a system for reading a plurality of identification tags and labels in which a interrogator/reader broadcasts an interrogation signal which initiates transmission from the tags. The tags are designed to output within a predefined time slot. Subsequent to successful communication with the reader, an acknowledge signal is transmitted to the tags. The tags cease communication in response to the acknowledge signal thereby allowing similarly coded tags to be read. Where collisions occur, the interfering tag retransmits signals in different time slots based on the timing signal transmitted from the interrogating system.

Dingwall et al., "System and Method for Remote Identification of Coded Articles and the Like," U.S. Pat. No. 5,502,445 (1996) describe a system in which badges 14 are interrogated by a beam 16 transmitted from directional antennas 18 of an interrogator/receiver unit 12. Dingwall was cited for showing that once a badge has been identified, an electronic circuit is put into an inactive or power-down state so that it will no longer respond to the interrogation/receiver unit as long as the badge remains within the range of beam 16 in order to facilitate identification of other badges 14.

As illustrated above, the primary prior art method for preventing RFID transponders from interfering with on-going reader operations, once their data has been read, has been to use a logic circuit to disable the RFID transponder from replying to the interrogation signal, the purpose being to improve communication with multiple tags by reducing the likelihood of interference. Typically, upon successfully transmitting the data, the tag receives a coded signal from the transmitter acknowledging its receipt. Logic circuits on the tag then enter a state that prevents further responses by the tag until either a second coded signal reactivates a response mode or until the tag is removed from and then re-enters the powering RF field. The powering off and on cycle has the effect of resetting the logic circuit in the RFID tag allowing it to respond anew.

It is also known to detune the tag's antenna by at least partially shorting out the antenna, as either a means of signaling or for depleting the energy stored in the antenna resonant structure.

BRIEF SUMMARY OF THE INVENTION

The antenna of an RFID tag or label is disconnected from the balance of the RFID chip by means of a series switch activated in response to a logic command, CLOAK, generated by the RFID chip. Activation of the switch disconnects the antenna of the RFID tag from the remainder of the RFID chip and effects a high impedance resistance across the antenna terminals. An RC circuit is charged by activation of the CLOAK signal and thereafter discharges during a predetermined RC time period as determined by a high impedance series antifuse leakage transistor. The antenna is thus disconnected for a time sufficient to allow the remaining RFID tags in an RF interrogation field to be identified. Meanwhile, during the disconnection of the antenna from the RFID chip and its loading causes its effective absorption and scattering aperture to be reduced near zero so as to electromagnetically remove the RFID tag from the zone of interrogation during the predetermined time period. Hence, the interrogated tag remains disconnected and noninterfering with the RF field used to interrogate the remaining tags.

More specifically, the invention is defined as an improvement in an RFID tag passively powered through an antenna comprising a series switch coupled between the antenna and the RFID tag. A time-delay circuit is coupled to and controls the series switch to activate the series switch to disconnect the RFID tag from the antenna for a predetermined time delay. The timed-delay circuit is activated by a logic command, CLOAK, which is generated by the RFID tag. The antenna is provided during the predetermined time period with a high impedance load, thereby reducing the effective absorption and scattering aperture of the antenna during the predetermined time period.

In the illustrated embodiment the time-delay circuit comprises an RC circuit and generates the pre-determined time period with a duration approximately 2–5 seconds long. The RC circuit includes an integrated circuit capacitor and a high impedance of series antifuse coupled in parallel to the integrated circuit capacitor as a discharging resistor. The series switch disconnects input data received from the antenna from the RFID tag and disconnects a tag chip voltage $V_{DD}$ from the antenna.

The improvement further comprises a rectifier bridge coupled to the antenna, a control device and an RC circuit. The bridge is coupled in series with the series switch to the RFID tag. The series switch includes the control device which is coupled to the bridge. The control device is coupled to the RC circuit. The control device is responsive to a logic signal, CLOAK, generated by the RFID tag to cause the RC circuit to be charged and to open the series switch to disconnect the antenna from the RFID tag for a predetermined time period as determined by the RC circuit. The series switch is also controlled by the control device to disconnect input data to the RFID tag received from the antenna.

The invention is also defined as a method of cloaking an RFID tag in an RF field comprising the steps of powering the RFID tag in the RF field and generating a logic signal, CLOAK, on a predetermined condition as determined by the RFID tag. A time-delay circuit is activated upon generation of the logic signal, CLOAK, to generate a predetermined time delay. A switch is activated to effectively open circuit the antenna for the predetermined time delay so that the effective absorption and scattering aperture of the antenna are minimized, or at least substantially reduced during the predetermined time delay.

The step of activating the time delay comprises charging an RC circuit to generate a control signal for opening the switch during an RC time delay as determined by the RC circuit. The step of activating the switch couples a high impedance load to the antenna to effectively open circuit the antenna during the predetermined time delay. The RFID tag coupled to the open circuited antenna is defined as a cloaked RFID tag, and wherein the predetermined time delay equals or exceeds a duration sufficient to allow identification of remaining RFID tags in the RF field, so that the cloaked RFID tag is included among a plurality of RFID tags in the RF field.

The invention now having been summarized, turn to the following drawing in which like elements are referenced by like numerals.

The invention now having been visualized in the foregoing drawings, the invention and its various embodiments may now be better understood by turning to the following detailed description of preferred embodiments.

DETAILED DESCRIPTION OF PREFERRED EMBODIMENTS

What is described in the following is a novel concept of effectively disconnecting the tag's antenna from the rest of the tag. This effective disconnection is done by means of circuits on the RFID tag that are designed to: (1) form a series switch between the antenna terminals and the logic circuitry of a chip comprising the tag; and (2) provide a means to maintain the switch in an open or antenna-disconnected state for a time period significantly long enough relative to the time required to identify remaining tags in the RF field. The time periods are determined by the voltage decay of a resistor-capacitor circuit. In the illustrated embodiment, an anti-fuse structure is used as a high-valued resistor to achieve these long RC time cost delays. The antenna of the RFID tag remains disconnected or loaded by a high impedance during the power on/off cycles, in the absence of the powering RF field and until the RC delay times out. The time delays are dependent on the exact process parameters utilized in fabricating the RFID tag and typically may be in the range of 2–5 seconds.

During this time-out period, the impedance coupled to the antenna terminals by the RFID chip is raised sufficiently high so that the antenna appears to be effectively open-circuited. This causes the antenna and the RFID tag to have both reduced absorption and reflection of the RF energy. This in turn amounts to a novel application of antenna theory, where an antenna whose terminals are open-circuited, both have a minimum effective absorption and scattering aperture for the RF interrogation and power field.

The advantage of the performance of an RFID system of the invention is that during the time that the antenna is effectively disconnected, the tag appears less visible in the RF field or is cloaked. The cloaked antenna interferes less with other tags, which are then going through the interrogation or identification process. Further, as each tag is in turn identified, a coded signal is transmitted to tell the identified tag to cloak itself. When in the cloaked state, this allows therefore more energy in the RF field to be available for reading the remaining tags in the interrogation zone. The overall capacity to read and identify multiple tags within the read range of a RFID system is significantly improved as a result of applying this concept.

Figure 1:
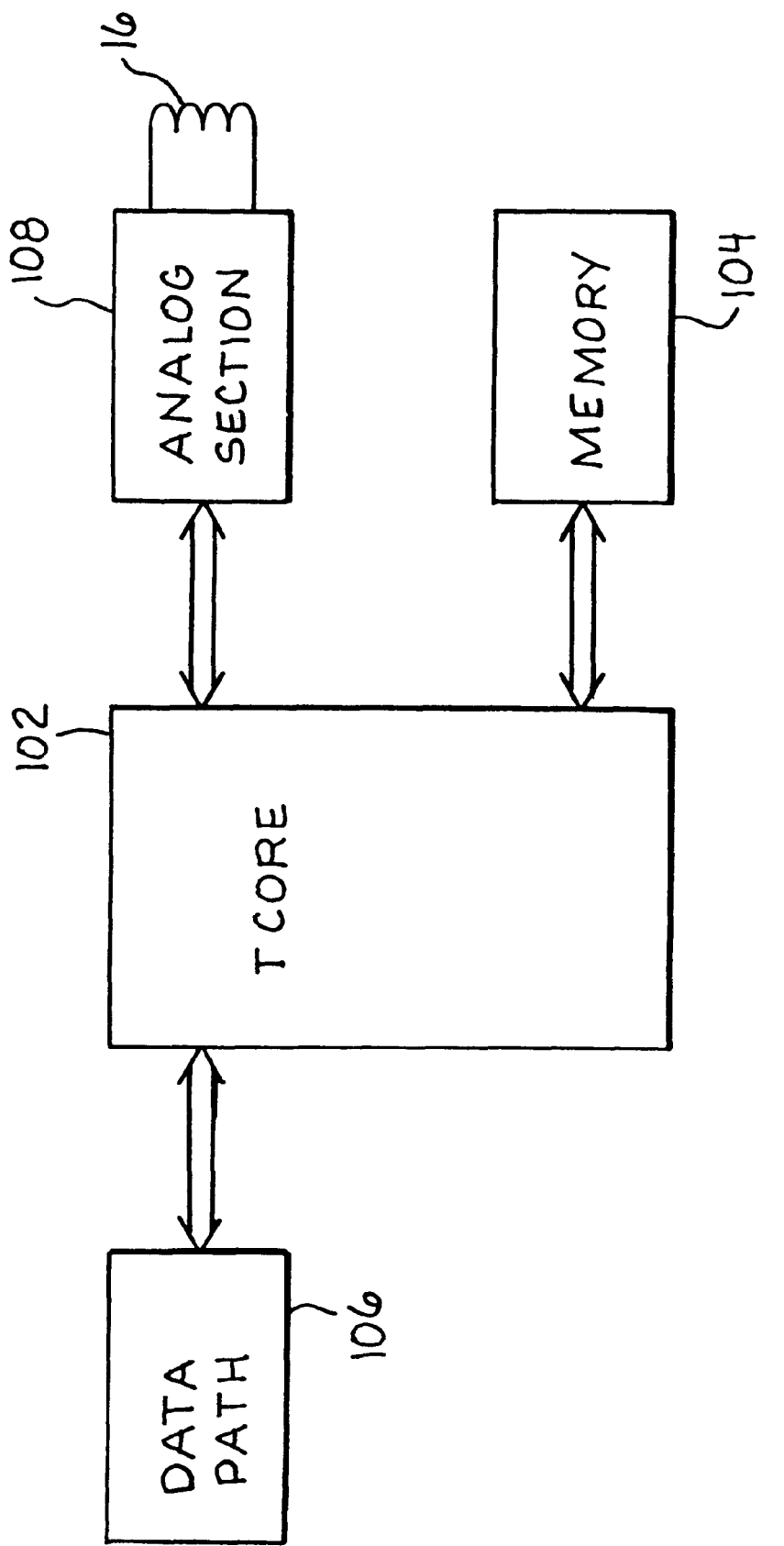
FIG. 1 is a block diagram showing an illustrative RFID in which the cloaking circuit of the invention is used.

FIG. 1 is a simplified block diagram of an RFID tag, generally drawn by reference numeral 100. In the illustrated embodiment, a tag core block 102 is coupled to a memory 104, which stores user data for later recall. A data path section 106 is coupled to tag core 102 and provides for a plurality of 17 bit data registers and logic circuitry associated with the registers. An analog section 108 is also coupled to tag core 102 and includes antenna 16 as shown and described below in FIG. 2. Analog section 108 includes cloaking circuit 10 of the invention and provides the input power drawn through antenna 16 from the RF field for powering tag 100. Cloaking circuit 10 of the invention shown in FIG. 2 selectively places a high impedance across terminals of antenna 16 to effectively open circuit the antenna and to disconnect tag core 102 from both its data input and from its power supply. It must be understood that many other tag organizations can be employed other than that shown in FIG. 1 which is illustrated only for the purposes of context. The operation and details of each of the circuit blocks shown in FIG. 1, being largely immaterial to the invention, will therefore not be further discussed in detail. The cloaking circuit of FIG. 2 therefore is explicitly understood to be used in any type of RFID tag or label, whether it has the architecture of tag 100 in FIG. 1 or not.

Figure 2:
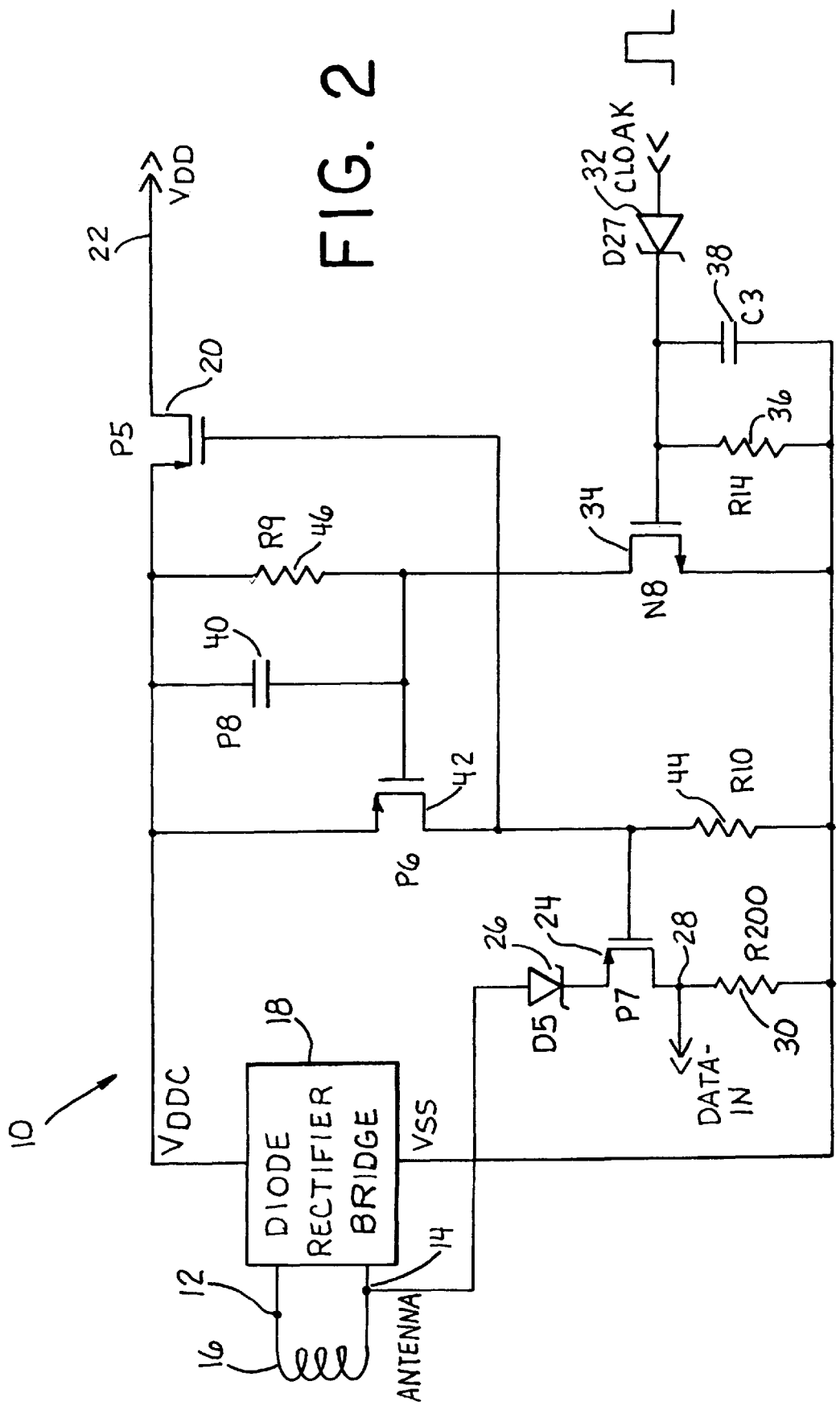
FIG. 2 is a simplified schematic diagram of the cloaking circuit of the invention.

FIG. 2 is a simplified schematic diagram of the cloaking circuit portion of an RFID tag designed according to the invention. The cloaking circuit, generally denoted by reference numeral 10, is coupled at terminals 12 and 14 to an antenna 16. Antenna 16 is shown in generalized form may include any type of antenna design now known or later discovered. Terminals 12 and 14 are in turn coupled to a DC diode rectifier bridge 18. Rectifier bridge generates the tag chip power supply voltage, $V_{DD}$ from RF energy received by antenna 16. The power supply voltage in the cloaking circuit of FIG. 2 is denoted as $V_{DDC}$. The ground terminal of bridge 18 is the chip ground voltage, $V_{SS}$. Power thus received by antenna 16 is converted into a modulated DCC used to power the RFID tag and to provide the coded information transmitted to and from the tag. The schematic of FIG. 2 shows a part of analog section 108 that performs conversion of RF power to DC voltage to power RFID chip 100 and to convert the RF pulses into digital data signals. The circuit of FIG. 2 also includes a cloaking feature of the invention as described below.

P type field effect transistor (PFET) 20 acts as a switch to connect or disconnect antenna 16 and diode rectifier bridge 18 from the rest of RFID chip 100. When chip 100 is operating, transistor 20 is held in the on or conducting state by having its gate tied to $V_{SS}$ through resistor 44, allowing rectifier voltage $V_{DDC}$ to be coupled on line 22 to the rest of chip 100. When cloaking is activated, transistor 20, along with PFET 24 are turned off and chip 100 is disconnected from antenna 16 and rectifier bridge 18. Transistor 24 is turned off to isolate the data input portion of this block. In other words, terminal 14 of antenna 16 is coupled through zener diode 26 to the source of transistor 24 whose drain is coupled to node 28, which provides the DATA-IN signal to chip 100, which is the digital data signal carried on the modulation on RF power field received by antenna 16. Node 28 in turn is coupled through resistor 30 to ground, $V_{SS}$.

To see the method of the effective disconnection of antenna 16, turn to the digital cloaking signal, CLOAK, provided as an input to zener diode 32. Cloak is generated in the tag core block 102 of RFID chip 100 in response to commands from a conventional remote scanner/receiver (not shown), which is the RFID interrogator used to interrogate each of the RFID tags in the interrogation field. When the digital logic signal, CLOAK, is asserted, the gate of N type field effect transistor (NFET) 34 is charged high, turning on transistor 34. The gate of transistor 34 is also coupled to through a parallel resistor 36 and parallel capacitor 38 to ground, $V_{SS}$. Resistor 36 and capacitor 38 assures that CLOAK must be active for an adequate time to turn on transistor 34 and that transistor 34 is held on for an appropriate time. When transistor 34 is on the voltage $V_{DDC}$ is applied across integrated circuit capacitor 40, which is charged to approximately $V_{DDC}$. Transistor 34 is also coupled to the gate of PFET 42, which is then pulled low and transistor 42 is turned on. Transistor 42 is coupled in series with a high impedance resistor 44 to $V_{SS}$. When transistor 42 is turned on, the gates of transistors 24 and 20 to which the drain of transistor 42 is connected go high and are turned off. With the gates of transistors 24 and 20 pulled high to $V_{DDC}$, transistors 24 and 20 are turned off, thereby disconnecting DATA IN node 28 and $V_{DDC}$ from line 22, the voltage supply line $V_{DD}$, of RFID chip 100. This completes the cloaking operation which effectively disconnects antenna 16 from RFID circuit 100.

Transistor 42 is maintained in the on condition as long as there is sufficient voltage applied to its gate or current is stored on capacitor 40. The voltage on capacitor 40 will decay at a rate set by the time constant of capacitor 40 which discharges through discharging resistor 46 which is coupled in parallel to capacitor 40. Capacitor 40 and resistor 46 therefore define an RC time-constant for an interval during which the RFID circuit will be cloaked. As long as transistor 42 is maintained on, both transistors 24 and 20 will remain off and the tag is cloaked. Resistor 46 in the preferred embodiment is a series connected structure of antifuses having a high impedance to allow a 2–5 second cloaking period to be effective without requiring a discrete element for capacitor 40 or a large capacity. Since capacitor 40 will typically have a capacity in the tens of picofarads, resistor 46 typically will have an impedance in the range of 10 to 100 gigaohms.

While cloaked, RFID chip 100 presents a high impedance to antenna 16.

The impedance load across terminals 12 and 14 of antenna 16 when control transistor 42 is turned on will be at equal to at least the impedance of resistor 44, which in the illustrated embodiment is chosen as a 6 gigaohm integrated circuit resistor. Antenna 16 will thus be heavily loaded during cloaking and will be effectively open circuited. As the termination resistance of the antenna load increases, effective scattering and absorption aperture of antenna 16 decrease. In the ideal case, the effective absorptive and scattering aperture of antenna 16 will approach zero for a nearly true open-circuited condition. With a reduced antenna apertures, less energy is absorbed or reflected from the cloaked RFID tags or labels, thereby allowing more RF energy in the interrogation field to reach other RFID tags in the field, thus increasing the reliability of reading them.

In 2–5 seconds defined by the RC time delay provided by capacitor 40 and resistor 46, the voltage on capacitor 40 will be discharged through resistor 46. The voltage on the gate of transistor 42 will hence be pulled back toward $V_{DDC}$, turning off transistor 42. CLOAK will have gone inactive when RFID chip 100 was disconnected from $V_{DDC}$ when transistor 20 was turned off. Hence, Transistor 34 will be off by the time that capacitor 40 is discharged. When transistor 42 is turned off again, the gates of transistors 20 and 24 are pulled low and transistors 20 and 24 are turned back on, reconnecting $V_{DD}$ to diode rectifier bridge 18 and DATA-IN node 28 to antenna 16.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in an RFID tag passively powered through an antenna comprising:
    a series switch coupled between said antenna and said RFID tag; and
    a time-delay circuit coupled to and controlling said series switch to activate said series switch to disconnect said RFID tag from said antenna for a predetermined time delay, said timed-delay circuit being activated upon a logic command, CLOAK, generated by said RFID tag, so that said antenna is provided during said predetermined time period with a high antenna load, thereby reducing the effective absorption and scattering aperture of said antenna during said predetermined time period.

2. The improvement of claim 1 wherein said time-delay circuit generates said pre-determined time period with a duration approximately 2–5 seconds long.

3. An improvement in an RFID tag passively powered through an antenna comprising:
    a series switch coupled between said antenna and said RFID tag; and
    a time-delay circuit coupled to and controlling said series switch to activate said series switch to disconnect said RFID tag from said antenna for a predetermined time delay, said timed-delay circuit being activated upon a logic command, CLOAK, generated by said RFID tag, so that said antenna is provided during said predetermined time period with a high antenna load, thereby reducing the effective absorption and scattering aperture of said antenna during said predetermined time period;
    wherein said time-delay circuit comprises an RC circuit; and
    wherein said RC circuit includes an integrated circuit capacitor and a high impedance of series antifuse coupled in parallel to said integrated circuit capacitor as a discharging resistor.

4. The improvement of claim 1 wherein said series switch disconnects input data received from said antenna from said RFID tag.

5. The improvement of claim 1 wherein said series switch disconnects a tag chip voltage $V_{DD}$ from said antenna.

6. The improvement of claim 4 wherein said series switch disconnects tag chip voltage $V_{DD}$ from said antenna.

7. The improvement of claim 1 further comprising a rectifier bridge coupled to said antenna, a control device and an RC circuit, said bridge coupled in series with said series switch to said RFID tag, said series switch including said control device coupled to said bridge, said control device coupled to said RC circuit, said control device responsive to a logic signal, CLOAK, generated by said RFID tag to cause said RC circuit to be charged and to open said series switch to disconnect said antenna from said RFID tag for a predetermined time period as determined by said RC circuit.

8. The improvement of claim 7 wherein said series switch is also controlled by said control device to disconnect input data to said RFID tag received from said antenna.

9. A method of cloaking an RFID tag in an RF field comprising:
    powering said RFID tag in said RF field;
    generating a logic signal, CLOAK, on a predetermined condition as determined by said RFID tag;
    activating a time-delay circuit upon generation of said logic signal, CLOAK, to generate a predetermined time delay;
    activating a switch to effectively open circuit said antenna for said predetermined time delay so that the effective absorption and scattering aperture of said antenna are minimized during said predetermined time delay.

10. The method of claim 9 where activating said switch couples a high impedance load to said antenna to effectively open circuit said antenna during said predetermined time delay.

11. The method of claim 9 wherein said RFID tag coupled to said open circuited antenna is defined as a cloaked RFID tag, and wherein activating said time-delay circuit generates said predetermined time delay equal to or exceeding a duration sufficient to allow identification of remaining RFID tags in said RF field, wherein said cloaked RFID tag is included among a plurality of RFID tags in said RF field.

12. A plurality of RFID tags, each RFID tag having a cloaking circuit coupled to an RFID tag comprising:
    an antenna;
    a switch in series with said antenna to selectively disconnect said antenna from said RFID tag, said switch being coupled between said antenna and said RFID tag;
    a time delay circuit coupled to said switch for disconnecting said antenna for a predetermined time period; and
    a logic circuit coupled to said time delay circuit for selectively activating said time delay circuit so that said antenna is provided with a substantially reduced effective absorbing and scattering aperture during said predetermined time period relative to other ones of said plurality of RFID tags in a common interrogation RF field.

13. The cloaking circuit of claim 12 further comprising a data input circuit coupled to said antenna, said data input circuit coupled to said switch and selectively disconnected by activation of said time delay circuit in response to said logic circuit.

14. A plurality of RFID tags, each RFID tag having a cloaking circuit coupled to an RFID tag comprising:
   an antenna;
   a switch in series with said antenna to selectively disconnect said antenna from said RFID tag, said switch being coupled between said antenna and said RFID tag;
   a time delay circuit coupled to said switch for disconnecting said switch for a predetermined time period; and
   a logic circuit coupled to said time delay circuit for selectively activating said time delay circuit so that said antenna is provided with a substantially reduced effective absorbing and scattering aperture during said predetermined time period relative to other ones of said plurality of RFID tags in a common interrogation RF field; and
      wherein time delay circuit is comprised of a capacitor and a parallel high impedance resistor, said resistor comprising a plurality of series coupled integrated circuit antifuses.

15. The cloaking circuit of claim 12 wherein activation of said switch by said time delay circuit couples a high impedance load to said antenna.

16. The method of claim 12 wherein said RFID tag whose antenna has been selectively disconnected is defined as a cloaked RFID tag and wherein said predetermined time delay equals or exceeds a duration sufficient to allow identification of remaining RFID tags in said RF field, wherein said cloaked RFID tag is included among said plurality of RFID tags in said RF field.

17. A method of cloaking an RFID tag in an RF field comprising:
   generating a logic signal, CLOAK, on a predetermined condition as determined by said RFID tag; and
   selectively coupling a high impedance load across an antenna coupled to said RFID tag to cause said antenna for said predetermined time period to exhibit an absorption and scattering aperture similar to an open circuited antenna.

18. The method of claim 17 further comprising disconnecting said antenna from said RFID tag in response to said CLOAK logic signal for said predetermined time period, including disconnection of data input to said RFID tag.

* * * * *